(12) United States Patent
Whitten

(10) Patent No.: US 6,621,493 B1
(45) Date of Patent: Sep. 16, 2003

(54) METAFILE COMPRESSION

(75) Inventor: Gordon T. Whitten, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/251,177

(22) Filed: Feb. 17, 1999

Related U.S. Application Data

(63) Continuation of application No. 08/549,465, filed on Oct. 27, 1995, now Pat. No. 5,990,899.

(51) Int. Cl.[7] .............................................. G06T 15/10
(52) U.S. Cl. ...................................... 345/427; 345/522
(58) Field of Search ................................ 345/427, 202, 345/522; 382/232, 244; 707/1, 3, 9

(56) References Cited

U.S. PATENT DOCUMENTS

| | | | |
|---|---|---|---|
| 5,073,926 A | 12/1991 | Suzuki et al. ................. | 379/53 |
| 5,761,676 A | * 6/1998 | Wood et al. ................. | 707/202 |

OTHER PUBLICATIONS

Yarmish et al., Assembly Language Fundamentals 360/370 OS/VS, DOS/VS, 1979, Addison–Wesley Publishing Co., chapters 3, 8 and 11.*
Use of Higher Level Programming Languages to Create Program Modifications. IBM Technical Disclosure Bulletin vol. 19, Issue 12, May 1, 1977.*
Library Macro Level Zap Capability. IBM Technical Disclosure Bulletin vol. 23, Issue 6, Nov. 1, 1980.*
Enterprise Systems Architecture/390 Principles of Operation (IBM manual), 1993.*
Shaw et al., "Microsoft Office 6–in–1 New Edition ", 1994, Que (Macmillan Computer Publishing), p. 688.*
IBM ESA/390 Principles of Operation Manual.*
OS/390 V2R7.0 MVS Diagnosis: Tools and Service Aids (manual).*
Article entitled "How to Use AMASPZAP (Superzap)" at http://mstack.cs.niu.edu/567/HO/ho4.html.*

* cited by examiner

Primary Examiner—Mark Zimmerman
Assistant Examiner—Lance W. Sealey
(74) Attorney, Agent, or Firm—Lee & Hayes, PLLC

(57) ABSTRACT

A Windows® metafile is compressed by first processing individual records. In some types of records, record type indicators are mapped to values having fewer significant bits than the original record type indicators. In addition, record length indicators are removed in some record types because they are constant values. In record types where the length varies, the record length indicator is divided to reduce its number of significant bits. There are also record types having one or more arguments that rarely change. For records of these types, the arguments are removed. There are other types of records whose arguments are often repeated from previous records of the same type. When this is the case, the arguments are removed. Many metafile arguments specify graphics coordinates in terms of absolute values. These absolute values are converted to relative values. In most cases, this reduces the number of significant bits required by the values. To further reduce the number of leading significant bits, negative values are negated and their original sign bits are stored separately. Once the records have been processed in this manner, individual data fields of the metafile are processed. Each data field has its leading zero bits removed. The remaining bits are packed into a variable number of bytes, often a smaller number than the original number of bytes used. Subsequent pattern matching compression is used to provide further compression gains.

16 Claims, 7 Drawing Sheets

METAFILE COMPRESSION

RELATED APPLICATIONS

This is a continuation of U.S. patent application Ser. No. 08/549,465, filed Oct. 27, 1995, which is now U.S. Pat. No. 5,990,899.

TECHNICAL FIELD

This invention relates generally to computer-implemented methods for compressing files containing graphics instructions. More specifically, the invention relates to methods for compressing instruction files, known as journal files or metafiles, used in conjunction with Microsoft Windows® graphics display interfaces.

BACKGROUND OF THE INVENTION

Graphical output under the Microsoft Windows 3.x®, Windows95®, and Windows NT® operating systems is generally accomplished through calls to operating system finctions. The operating system components used for carrying out graphics instructions are collectively referred to as the graphic device interface or GDI.

The Windows® GDI uses dynamically created objects or resources for carrying out drawing operations. Resources are classified into four different categories or classes: pens, brushes, palettes and fonts. One resource from each class can be currently selected at any given time. Different GDI resources are is used to perform various types of drawing operations.

GDI drawing instructions can be used to form a variety of shapes or images, such as lines, arcs, regions, ellipses, polygons, rectangles, and bitmaps. Drawing a straight line is an example of a simple operation that can be performed with GDI instructions. To draw a line, a pen is created, selected, used, and then deleted. This involves four different instructions or GDI function calls: CREATEPEN, SELECTOBJECT, LINETO, and DELETEOBJECT.

GDI drawing instructions operate with reference to a two-dimensional display medium—commonly a computer's CRT. Two-dimensional coordinate pairs are thus used in many GDI instructions to specify locations for different types of graphics shapes and entities.

In addition to providing a convenient way to create device-independent graphics images, the Window® GDI can be used to create data files for storing such images. Rather than storing the images in bit-mapped format, they are stored as an ordered sequence of GDI instructions which are later "played" to create an actual display image. The Windows® GDI contains functions for recording and storing GDI instructions in such files, which are referred to as journal files in general and as "metafiles" in the Windows® environment. A metafile is simply a collection of GDI commands that creates desired text or images. Metafiles take up less space than bitmaps. In addition, they are more device-independent than bitmaps. They are also scalable in size, in that sizes and positions are specified in terms of an output frame that can be mapped to a different size during playback. For, these reasons, metafiles provide convenient storage for images that appear repeatedly in an application or need to be moved from one application to another.

To generate a metafile, a Windows® application creates a special device context that sends GDI commands to a metafile for storage. The application can later play back the metafile and display the image. During playback, the GDI breaks the metafile down into records and executes the instruction defined by each record.

A metafile consists of two pertinent parts: a header and a list of records. The header contains a description of the size of the metafile, the number of drawing resources it uses, and other information. Each metafile record contains a header, a GDI instruction, and its arguments.

GDI finctions and metafiles will be familiar to those accustomed to programming in the Windows® environment. For more information regarding these subjects, refer to the Windows 3.1®, Windows95® and Windows NT® Programming Manuals, available from Microsoft Corporation of Redmond, Wash. These references are hereby incorporated by reference.

While metafiles offer an attractive alternative to bit-mapped files, further size reduction would be welcomed—particularly in the context of newer consumer-oriented applications which attempt to utilize graphical user interfaces to a degree that has previously not been attempted. The invention described below meets this need, compressing the data contained in metafiles by ratios not previously attainable.

SUMMARY

A compression program receives individual instructions of an original journal file, processes the instructions, and writes them to a processed journal file. If a particular instruction has one or more arguments that can be inferred, the instruction is revised by replacing its record type indicator with a substitute record type indicator and removing the one or more arguments that can be inferred.

When subsequently playing back the instructions of the processed journal file, substitute record type indicators are recognized and replaced by the original record type indicators. In addition, the original arguments are inferred and replaced.

DETAILED DESCRIPTION OF THE PREFERRED EMBODIMENT

Figure 1:
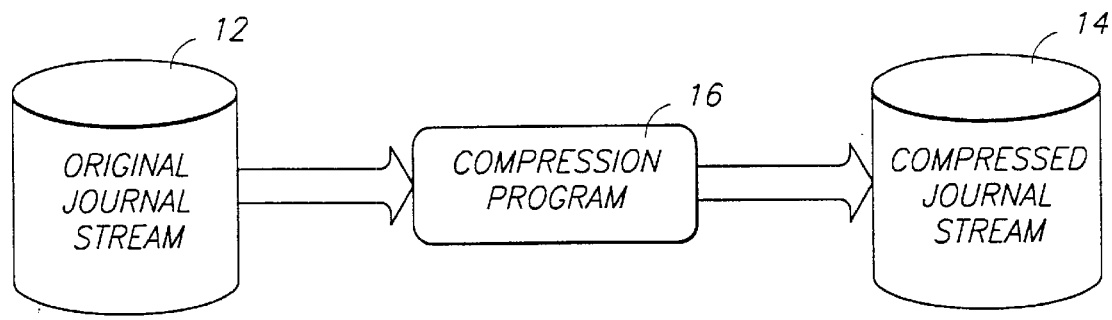
FIG. 1 is a block diagram showing data flow in a process of compressing a metafile in accordance with a preferred embodiment of the invention.

FIG. 1 shows a general computer-implemented method of processing or compressing an original journal stream 12 using a compression program 16, resulting in a compressed journal stream 14. Original journal stream 12 contains a sequence of individual journal records or GDI instructions in a standard Windows 3.x®, Windows95®, or Windows NT® format. Compressed journal stream 14 is created by compressing individual data fields and records of original journal stream 12. Optimization program 16 reads data fields and records from original journal stream 12, compresses them, and emits or writes them to compressed journal stream 14.

In the preferred embodiment, the journal streams comprise actual data files. For instance, original journal stream 12 comprises a journal file or metafile that has already been created by another computer program. Compressed journal stream 14 comprises a journal file, metafile, or other type of data structure that is stored in digital format on some type of non-volatile computer-readable storage medium such as a hard disk.

Alternatively, compression program 16 can be configured to read or accept journal records from another medium or in another form. For example, compression program 16 can be configured to accept journal records on a real-time basis as they are produced by another computer program. Similarly, compression program 16 can be configured to write or emit journal records to another medium or in another form. For example, compressed journal records can be written directly to a communications port rather than to a data file. This might be useful when transmitting metafiles over relatively slow transmission media such as telephone lines.

While the compression steps disclosed herein achieve results that are significantly better than prior art compression steps by themselves, further reduction in metafile sizes can be obtained by first performing instruction optimization steps as disclosed in another U.S. patent application entitled "Metafile Optimization" by inventor Gordon T. Whitten, filed concurrently herewith, which is now issued as U.S. Pat. No. 5,987,257.

Figure 2:
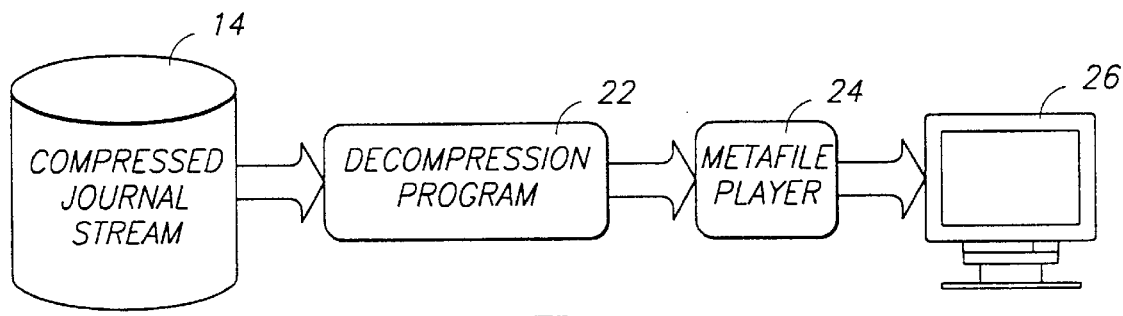
FIG. 2 is a block diagram showing data flow in a process of decompressing and playing a metafile that has previously been compressed in accordance with FIG. 1.

FIG. 2 shows a general computer-implemented process of processing and playing compressed metafile 14 using a decompression program 22 and a metafile player 24. Decompression program 22 reads data fields and records from compressed metafile 14, decompresses them, and passes them to a metafile player 24. Metafile player 24 processes the metafile records in a conventional manner and plays them back on a computer's display screen or CRT 26. Alternatively, decompression program 22 might write the decompressed records to a data file or another output stream, for subsequent use by a metafile player.

Figure 3:
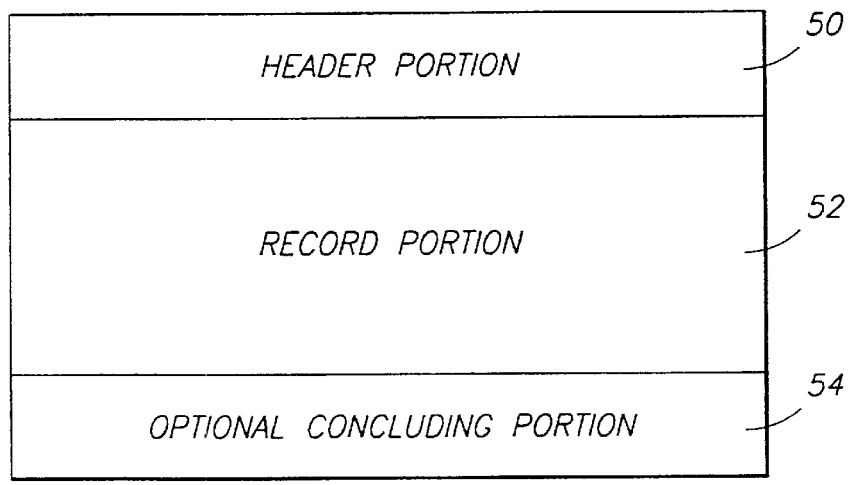
FIG. 3 shows the parts of a Windows® metafile.

FIG. 3 shows the general format of a metafile. It comprises an initial header portion 50, a subsequent record portion 52, and an optional concluding portion 54. Header portion 50 contains information about the metafile such as its format and size. -Record portion 52 contains a plurality of individual metafile records of different types.

An instruction record in record portion 52 comprises a record header and one or more arguments. A record header contains a record type indicator and a record length indicator. The arguments follow the record header.

Individual data items and values in metafile headers and journal records are represented by one or more data fields. Within a given metafile, each data field is formatted as a predetermined number of binary terms. Such binary terms are conventionally eight bits (one byte) in length. In Windows 3.x® metafiles, each data field comprises two bytes. In a Windows95® or Windows NT® metafile, a data field generally comprises four bytes (although there is at least one type of Windows95®/Windows NTC record containing two-byte data fields). One or more adjacent data fields are used to form individual values specified in metafile 12.

Figure 4:
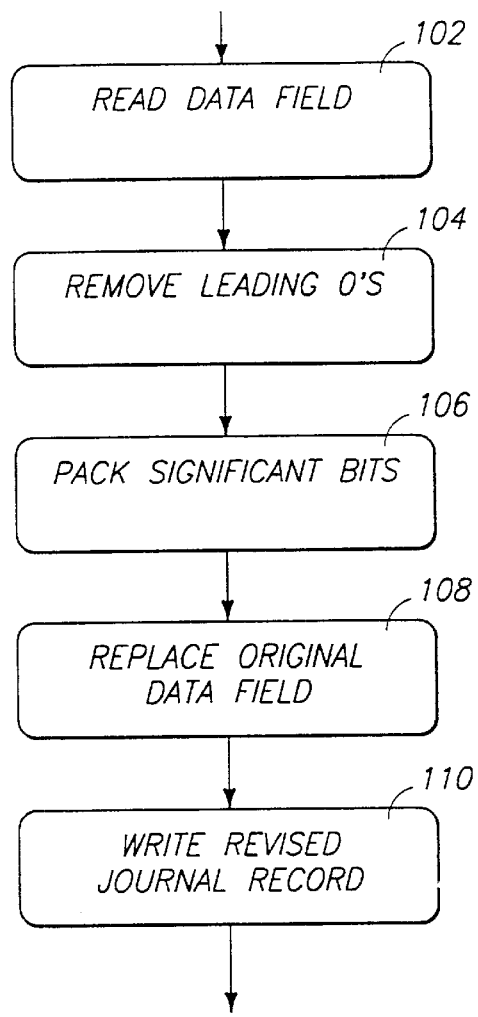
FIGS. 4–10 show preferred methodical aspects of the invention.

FIG. 4 shows preferred steps in accordance with one aspect of the invention. This aspect of the invention is performed on every 16-bit data field of a Windows 3.x® metafile, or upon every 32-bit data field of a Windows95® or Windows NT® metafile. A first step 102 comprises reading a data field from original metafile 12. Compression program 16 then performs a step 104 of removing leading zero bits from the data field, leaving only a set of remaining significant lower-order bits.

A step 106 comprises packing the remaining significant lower order bits into a variable number of packed binary terms or bytes, wherein the number of bytes used depends on the number of remaining significant lower order bits. For example, if step 104 leaves only 5 significant lower-order bits, all of them can be packed into a single byte. In a Windows95® or Windows NT® metafile, this results in a compression ratio of as much as 4 to 1, since the minimum size of an uncompressed data field is 4 bytes.

In the preferred embodiment, step 106 includes a step of reserving a bit in at least one of the variable number of packed bytes. The reserved bit is used to indicate whether the byte is followed by another packed byte containing additional significant lower-order bits of the original data field. The highest-order bit (bit 7) of each packed byte is reserved for this function. If bit 7 of a particular packed byte is equal to 1, the byte is followed by another packed byte containing additional significant bits of the original value. If bit 7 is equal to zero, the packed byte contains the last of the bits contributing to the original data field.

Step 108 comprises replacing the predetermined number bytes in the original metafile, representing a single data field, with the variable number of packed bytes resulting from step 106. This results in revised data fields and journal records that are written to compressed journal stream 14 in step 110.

Figure 5:
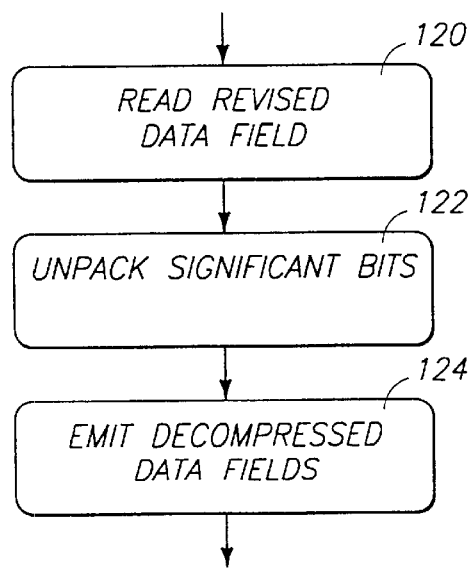

FIG. 5 shows steps involved in decompressing a metafile that has been produced in accordance with the steps of FIG. 4. A first step 120 comprises reading revised data fields from a compressed metafile. Step 122 comprises unpacking the variable number of bytes of each data field, to restore the data fields to their original format in which each data field is a fixed number of bytes in length. Step 124 comprises writing or emitting the restored data fields to a metafile player or to an uncompressed metafile.

The steps described above yield good compression ratios. Further improvements are possible, however, by performing several other data manipulations before performing the steps of FIG. 4. These further manipulations are described below.

Figure 6:
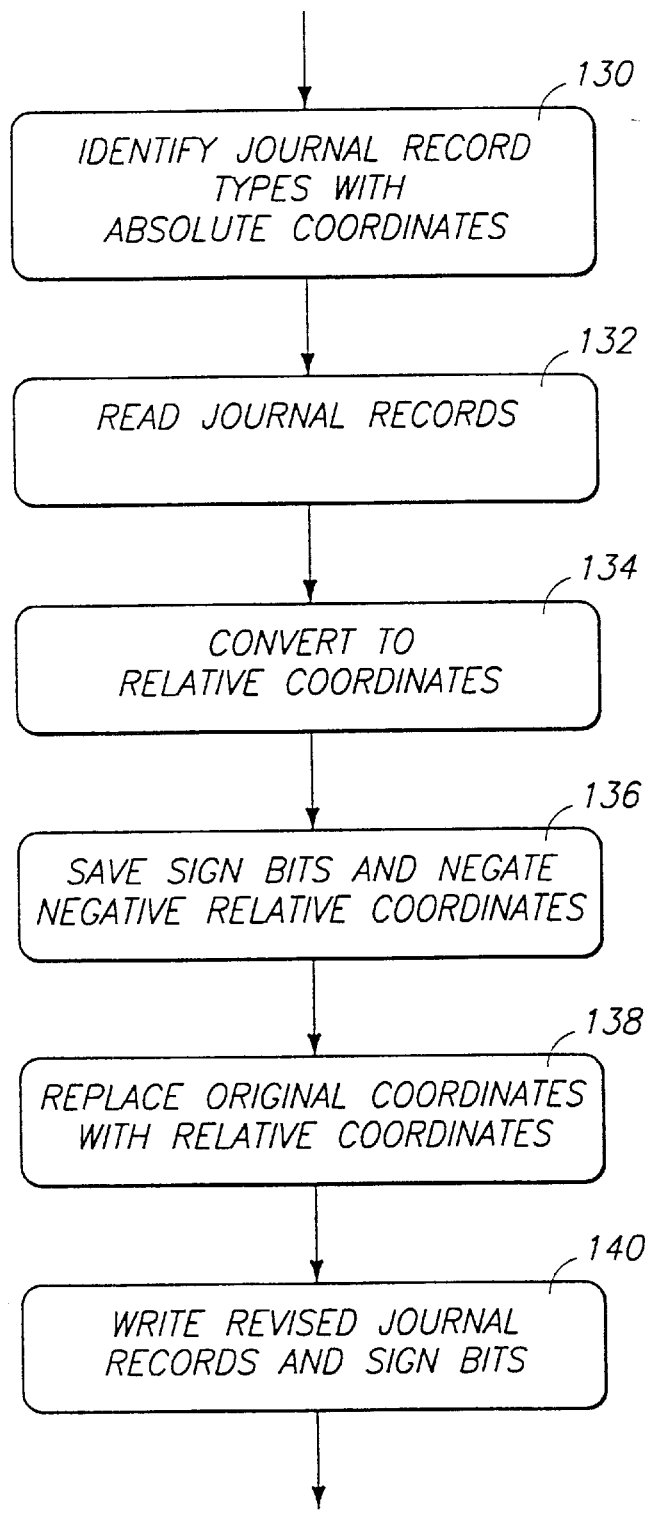

FIG. 6 shows steps that are performed in the preferred embodiment of the invention to pre-process certain journal records and data fields prior to performing the steps of FIG. 4. As already discussed, the instructions contained in metafile 12 are members of the Windows® GDI or metafile instruction set. The instruction set includes different types of instructions, each used to accomplish a specific result. One subset of GDI instructions, referred to as polygon and polyline instructions, utilize variable numbers of arguments to draw polygons and multiple-segment lines. The arguments of the instructions specify graphics coordinate pairs for end points of line segments forming the desired polygons and polylines. The coordinate pairs are specified in absolute terms, relative to a fixed point in a display frame.

A step 130 of FIG. 6 comprises identify journal record types that have or specify absolute graphics coordinates. As mentioned, these consist primarily of the polygon and polyline instructions, of which there are various forms, in the Windows® GDI. Step 132 comprises reading a plurality of journal records of the identified types from the original journal stream. These journal records defme an ordered sequence of absolute coordinate pairs.

A step 134 comprises converting the ordered sequence of absolute graphics coordinates or coordinate pairs to a corresponding ordered sequence of relative graphics coordinates or coordinate pairs. From a particular coordinate pair, the previously-occurring coordinate pair in the ordered sequence is subtracted to yield a relative graphics coordinate or coordinate pair. For conversion of the first-occurring absolute graphics coordinate pair, the previous coordinate pair is assumed to be 0,0.

Step 134 is followed by a step 136 of negating any relative graphics coordinates having negative values. Following conventional binary formats, each relative coordinate value will have a sign bit as its most significant digit. When this bit is set to 1, the coordinate value is negative. However, a 1 in the most significant bit eliminates any compression gains that night be gained by the leading bit removal steps of FIG. 4. Furthermore, small negative numbers typically have binary 1's as their leading bits following the sign bit. Negating or taking the absolute value of negative numbers, on the other hand, potentially leaves a significant number of leading 0's in each coordinate. The original sign bit value of each relative coordinate is saved so that negated numbers can be restored to their original negative values during subsequent decompression.

Step 138 comprises replacing the absolute graphics coordinates of the journal records with the relative graphics coordinates to form revised journal records. These journal records are written to a compressed journal stream in step 140. The sign bits of the original, non-negated values are combined into single-byte or multiple byte values or data fields and written separately to the compressed journal stream. The compression steps of FIG. 4 preferably follow the steps of FIG. 6.

Certain versions of the GDI EXTSELECTCLIPRGN record can also be processed in accordance with the steps of FIG. 6. When RGN_COPY and RDH_RECTANGLES values are set within an EXTSELECTCLIPRGN record, the resulting record contains a series of absolute coordinates. Each set of coordinates is subtracted form the next in accordance with the description above to change the absolute coordinates to relative coordinates.

Figure 7:
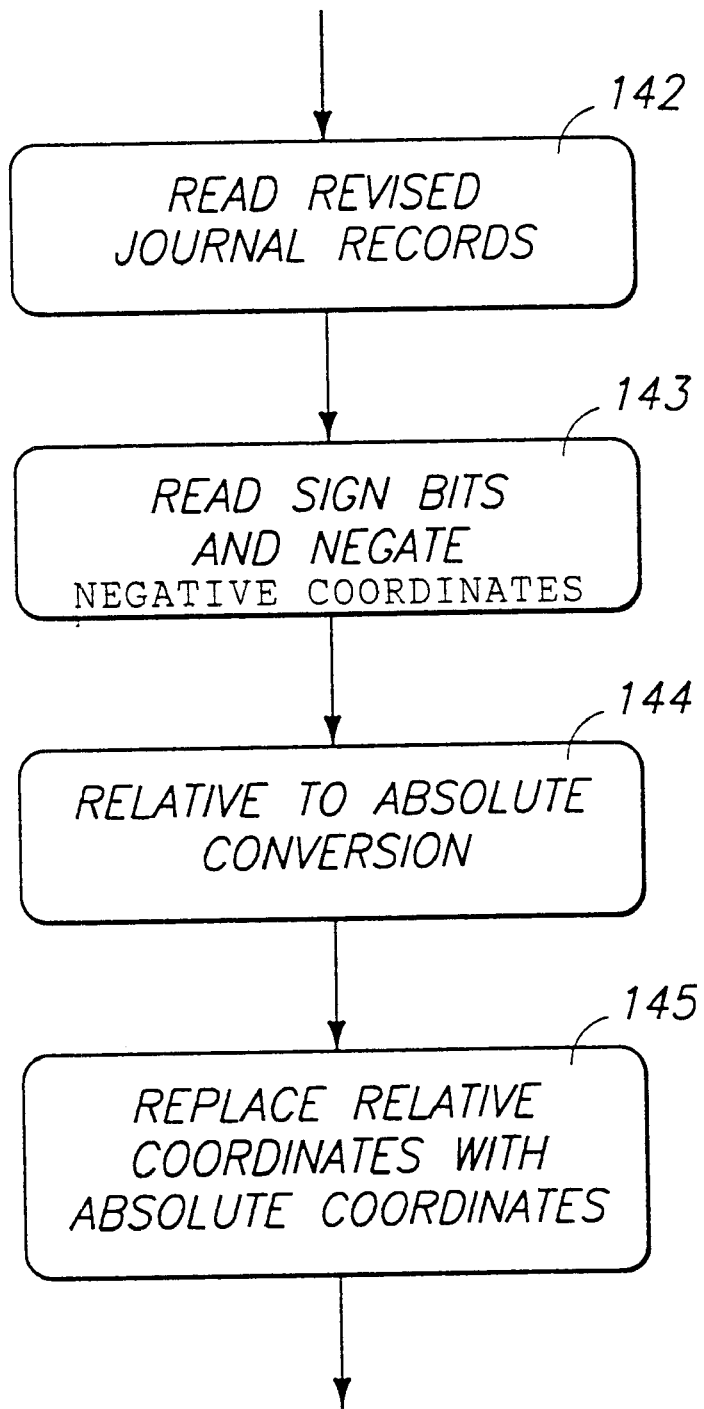

FIG. 7 shows preferred steps of decompressing a metafile after it has been compressed using the steps of FIG. 6. A first step 142 comprises reading revised journal records from the compressed metafile. Step 143 comprises reading the sign bits and negating any negative relative graphics coordinates, resulting in the ordered sequence of relative graphics coordinates created by step 134 of FIG. 6. Step 144 comprises converting the ordered sequence of relative graphics coordinates back to the ordered sequence of absolute graphics coordinates. Step 145 comprises replacing the relative graphics coordinates of the revised journal records with the absolute graphics coordinates.

Figure 8:
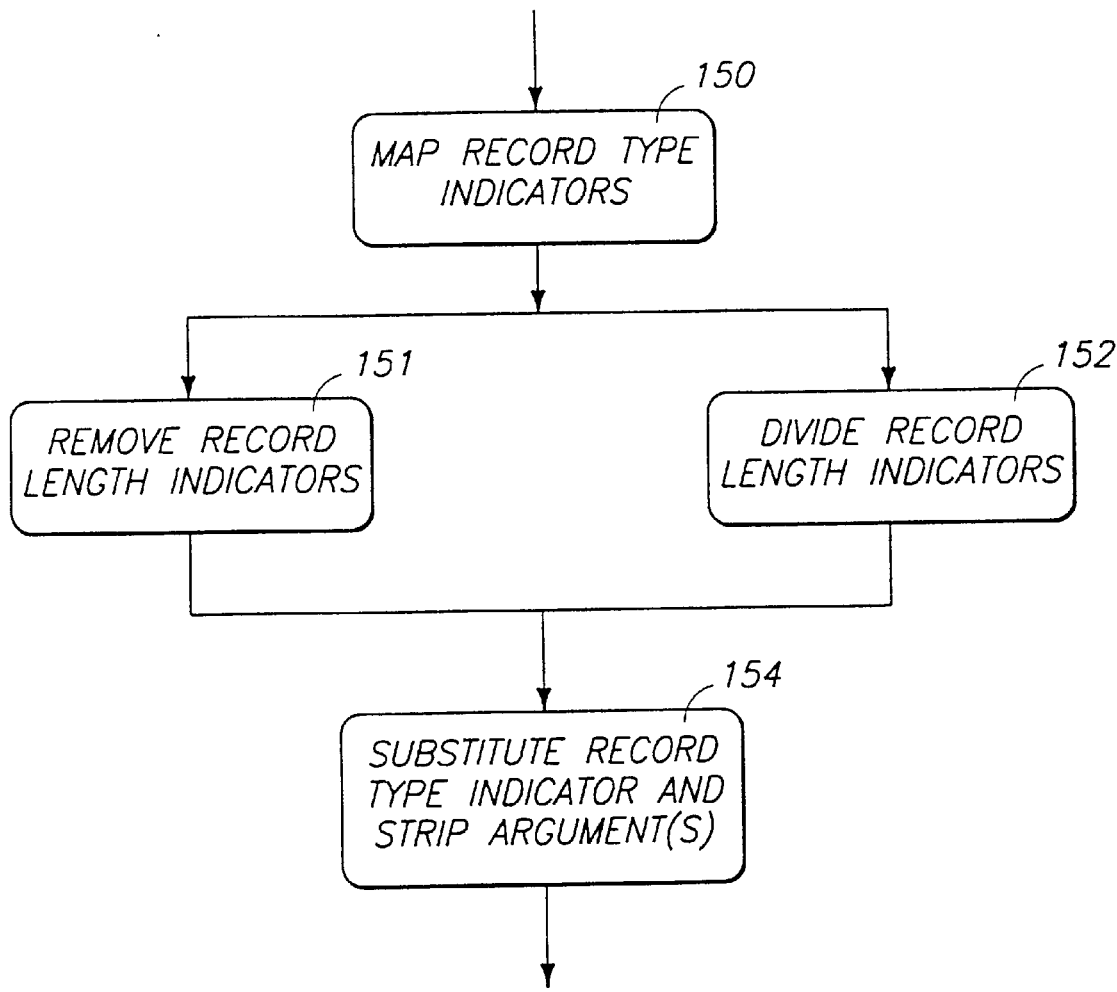

FIG. 8 shows additional steps in accordance with the invention, preferably performed in conjunction with the steps already described. A record in a Windows metafile consists of a record type indicator, a record length indicator corresponding to the number of bytes in the record, and arguments. In Windows 3.1® metafiles, record type indicators are complex values that occupy a plurality of binary terms or bytes. Specifically, each such record type indicator occupies 16 bits or two bytes. In FIG. 8, the compression program performs a step 150 of mapping such record type indicators to values that occupy only single binary terms or bytes. This is possible because there are fewer than 256 possible record types in Windows® 3.1 metafiles. This mapping is not performed in Windows95® and Windows NT® metafiles, even though the record type indicators in these files are each 32 bits in length. The mapping is not performed in these cases because the record type indicators are already tightly packed.

Step 151 comprises removing record length indicators for certain types of records. This can be done because the length of certain record types is a constant. The decompression program can restore the record length indicator simply by knowing the record type.

An alternative compression step 152 takes advantage of the fact that arguments within Windows® metafiles always consist of one or more data fields, and that data fields are always a fixed size larger than a byte. Because of this, the number of bytes in a record is always a multiple of a whole number. In Windows95® and Windows NT® metafiles, data fields are almost always four bytes in length. Accordingly, a record length is almost always a multiple of four. In Windows 3.x® metafiles, data fields are two bytes in length and the record length is always a multiple of two. Step 152 comprises dividing the record length indicators by a whole number—either four (for NT metafiles) or two (for 3.x metafiles). This reduces the number of significant bits in each record length indicator and increases the effectiveness of the leading bit removal steps described with reference to FIG. 4.

Only one of steps 151 and 152 are performed with respect to any particular record.

A further step 154 takes advantage of the fact that certain types of instructions in Windows® metafiles have at least one argument that can be inferred. For instance, the GDI RESTOREDC instruction has an argument that is usually equal to 0xffffffff. When this is the case, compression program 16 revises the journal record by replacing its original record type indicator with a substitute record type indicator and stripping the argument from the journal record. The substitute record type indicator is a value that is not otherwise valid as a record type indicator in a conventional, uncompressed metafile. When the revised record is read from the compressed metafile, the decompression program recognizes the substitute record type and restores the original record type indicator. It also infers the argument based on the substitute record type, and adds the argument back to the journal record.

Other record types have values that can be inferred from previous instructions of the same type. These record types frequently have one or more arguments that are the same as the arguments of a previous record of the same type. GDI instructions in this category include DELETEOBJECT, SELECTOBJECT, SETROP2, SETPOLYFILLMODE, CREATEBRUSHINDIRECT, and CREATEPEN. Records of these types are revised by replacing the original record type indicator with a substitute record type indicator and stripping the repeated arguments. The arguments are restored by the decompression program upon recognizing the substitute record type indicator. The decompression program obtains the arguments by referring to the previous instructions of the same type.

Figure 9:
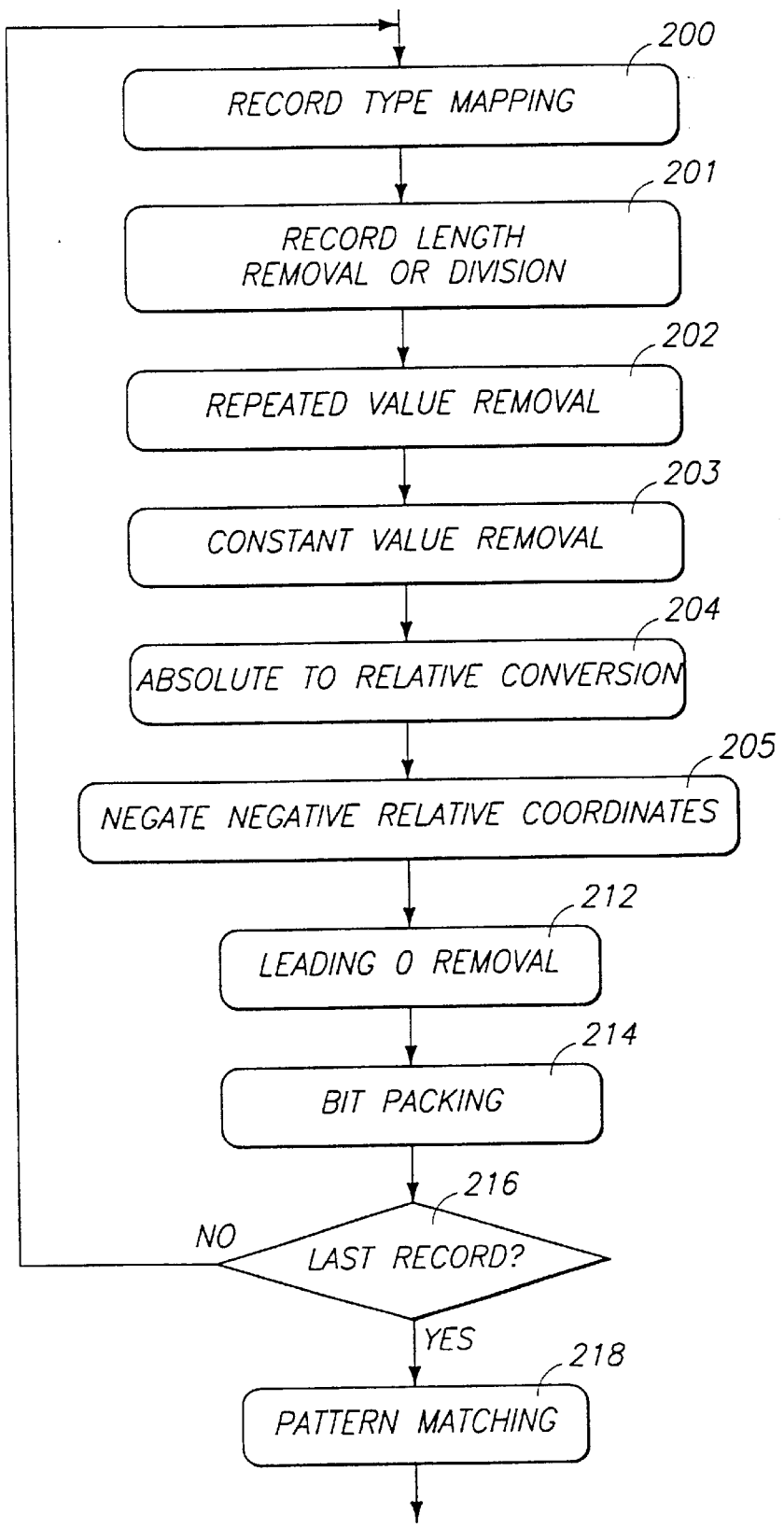

FIG. 9 summarizes the compression steps utilized in the preferred embodiment of the invention. A metafile is processed record-by-record. If the compression program finds data that cannot be identified as a record, the data is handled simply as a sequence of bytes. Step 200 comprises the step of mapping record type indicators to 8-bit values (performed only for Windows® 3.1 metafile records). Step 201 comprises an optional step of removing record length indicators or dividing them by a whole number to reduce the number of significant bits in the record length indicators. Step 202 comprises stripping arguments from instructions of identified types when the arguments are repeated from previous instructions of the same types. Step 203 comprises stripping arguments from instructions when the arguments can be inferred from the instruction type itself. Step 204 comprises converting absolute graphics coordinates to relative coordinates to thereby reduce the number of significant bits in the coordinates. Step 205 comprises negating any negative relative coordinates.

Step 212 comprises removing leading zeros from each data field. Step 214 comprises packing the remaining bits into as many bytes as needed to fully contain the remaining bits. Decision block 216 indicates that the preceding steps are repeated for every record of the original metafile. The concluding portion of the original metafile is not altered.

Once these steps have been completed, the resulting compressed journal stream is advantageously processed with a pattern recognizing compression scheme as indicated in block 218. A variety of such compression schemes are available and commonly used to compress data files of various types. For instance, a scheme known as the "LZ" compression scheme can be used to further compress the journal stream. The methods described above enhance the operation of such pattern recognizing schemes by increasing the occurrences of repeating patterns within the journal stream. For example, specifying coordinates in relative terms in many cases will result in recurring instructions or coordinate sequences, when identical polygons, polylines, or line segments are drawn at different absolute locations. As another example, removing sign bits reduces the number domain of coordinate pairs, further increasing the opportunities for pattern matching.

After completing the compression steps of FIG. 9, the journal stream is written as a data file on a non-volatile storage medium. The header of the metafile is preferably altered in a way that indicates the compression methods used, so that the decompression program can omit decompression steps for files that have not been compressed.

Figure 10:
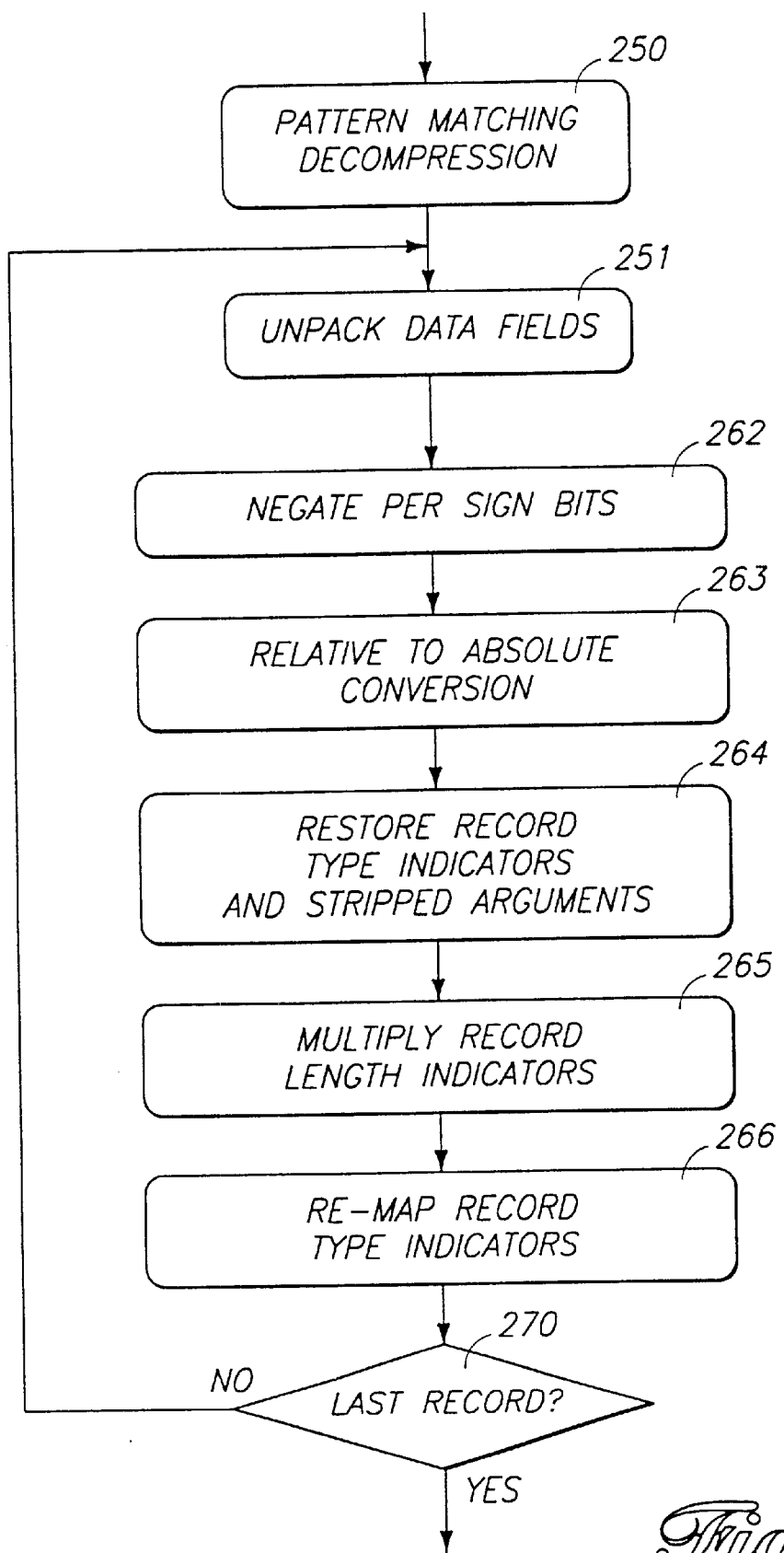

FIG. 10 summarizes preferred steps of decompressing a metafile that has been compressed in accordance with the steps of FIG. 9. The steps of FIG. 10 are generally the inverse of those shown in FIG. 9. In step 250, the entire metafile is decompressed in accordance with whatever pattern matching compression scheme was used in step 218 of FIG. 9. Step 251 comprises unpacking the data fields, represented in the compressed metafile by variable groups of packed binary terms, to format the data fields in their original format. This inherently restores the leading zeroes.

Step 262 comprises reading the sign bits from the compressed journal stream and negating any relative graphics coordinates that are indicated, by the corresponding sign bits, to be negative. Step 263 comprises converting the relative graphics coordinates back to the original ordered sequence of absolute coordinates. Step 264 comprises recognizing any journal records having substitute record type indicators, restoring the original record type indicators to such records, and adding the stripped argument back to the record.

Step 265 comprises multiplying record length indicators by the whole number used to perform the division in step 201. Step 266 comprises re-mapping the record type indicators to their original 16-bit or 32-bit values. Steps 251 and 262–266 are performed for every journal record, as indicated by decision block 270. The decompressed journal stream is then passed to a metafile player or simply stored in a decompressed metafile for later playback.

The steps described above provide significant compression gains over previous methods that primarily involved pattern matching techniques. The invention allows metafiles to be stored in a compact format while allowing playback programs to decompress and play the metafiles with little additional overhead.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method comprising:

receiving an ordered sequence of instructions from an original journal stream, each instruction comprising a record type indicator, at least some of the instructions comprising one or more arguments associated with the record type indicators;

if a particular instruction has at least one argument whose value can be inferred, revising the instruction by replacing its record type indicator with a substitute record type indicator and removing said at least one argument;

writing the revised instruction to a processed journal stream.

2. A method as recited in claim 1 wherein the value of said at least one argument can be inferred because the argument commonly has a particular value in instructions having the record type indicator of said particular instruction.

3. A method as recited in claim 1 wherein the value of said at least one argument can be inferred from values of arguments of one or more previous instructions in the ordered sequence of instructions.

4. A method as recited in claim 1, further comprising:

receiving an ordered sequence of instructions from the processed journal stream;

if a particular instruction from the processed journal stream has the substitute record type indicator, restoring an original record type indicator, inferring the value of said at least one argument, and adding said at least one argument to said particular instruction.

5. A method as recited in claim 4, wherein said inferring comprises inferring the value of said at least one argument from values of arguments of one or more previous instructions in the processed journal stream.

6. A computer-readable storage medium having a data structure comprising a processed journal stream created in accordance with claim 1, the processed journal stream comprising an ordered sequence of instructions that are executable by a computer.

7. A method comprising:

receiving an ordered sequence of instructions from an original journal stream, each instruction comprising a record type indicator, at least some of the instructions comprising one or more arguments associated with the record type indicators;

if a particular instruction has a record type indicator that is associated with an argument commonly having a particular value, revising the instruction by replacing its record type indicator with a substitute record type indicator and removing said argument from the instruction;

writing the revised instruction to a processed journal stream.

8. A method as recited in claim 7, further comprising:

receiving an ordered sequence of instructions from the processed journal stream;

if a particular instruction from the processed journal stream has the substitute record type indicator, restoring an original record type indicator and adding the particular value as an argument.

9. A computer-readable storage medium having a data structure comprising a processed journal stream created in accordance with claim 7, the processed journal stream comprising an ordered sequence of instructions that are executable by a computer.

10. A method comprising:

receiving an ordered sequence of instructions from an original journal stream, each instruction comprising a record type indicator, at least some of the instructions comprising one or more arguments associated with the record type indicators;

if a particular instruction has at least one argument whose value can be inferred from one or more previous instructions in the ordered sequence of instructions, revising the instruction by replacing its record type indicator with a substitute record type indicator and removing said at least one argument;

writing the revised instruction to a processed journal stream.

11. A method as recited in claim 10, further comprising:

receiving an ordered sequence of instructions from the processed journal stream;

if a particular instruction from the processed journal stream has the substitute record type indicator, restoring an original record type indicator, inferring the value of said at least one argument from one or more previous instructions in the processed journal file, and adding said at least one argument to said particular instruction.

12. A computer-readable storage medium having a data structure comprising a processed journal stream created in accordance with claim 10, the processed journal stream comprising an ordered sequence of instructions that are executable by a computer.

13. A method comprising:

receiving an ordered sequence of records from an original journal stream, each record comprising a record type indicator, at least some of the records comprising one or more arguments associated with the record type indicators;

for each record, determining whether its record type indicator is one that is associated with an argument commonly having a particular value;

if a particular record has a record type indicator that is associated with an argument commonly having a particular value, revising the record by replacing its record type indicator with a substitute record type indicator and removing said argument from the record;

writing the revised record to a processed journal stream.

14. A method as recited in claim 13, further comprising:

receiving an ordered sequence of records from the processed journal stream;

if a particular record from the processed journal stream has the substitute record type indicator, restoring an original record type indicator and adding the particular value as an argument.

15. A method comprising:

receiving an ordered sequence of records from an original journal stream, each record comprising a record type indicator, at least some of the records comprising one or more arguments associated with the record type indicators;

for each record, determining whether the values of one or more of its arguments can be inferred from previous records in the ordered sequence of records;

if a particular record has at least one argument whose value can be inferred from previous records in the ordered sequence of instructions, revising the record by replacing its record type indicator with a substitute record type indicator and removing said at least one argument;

writing the revised instruction to a processed journal stream.

16. A method as recited in claim 15, further comprising:

receiving an ordered sequence of records from the processed journal stream;

if a particular record from the processed journal stream has the substitute record type indicator, restoring an original record type indicator, inferring the value of said at least one argument from one or more previous records in the processed journal file, and adding said at least one argument to said particular record.

* * * * *

UNITED STATES PATENT AND TRADEMARK OFFICE
CERTIFICATE OF CORRECTION

PATENT NO. : 6,621,493 B1
DATED : September 16, 2003
INVENTOR(S) : Whitten

It is certified that error appears in the above-identified patent and that said Letters Patent is hereby corrected as shown below:

<u>Column 1,</u>
Line 45, replace "Window®" with -- Windows® --.

<u>Column 5,</u>
Line 45, replace "Windows" with -- Windows® --.

Signed and Sealed this

Third Day of February, 2004

JON W. DUDAS
*Acting Director of the United States Patent and Trademark Office*